US006978357B1

(12) United States Patent
Hacking et al.

(10) Patent No.: US 6,978,357 B1
(45) Date of Patent: Dec. 20, 2005

(54) METHOD AND APPARATUS FOR PERFORMING CACHE SEGMENT FLUSH AND CACHE SEGMENT INVALIDATION OPERATIONS

(75) Inventors: Lance Hacking, Portland, OR (US); Shreekant Thakkar, Portland, OR (US); Thomas Huff, Portland, OR (US); Vladimir Pentkovski, Folsom, CA (US); Hsien-Cheng E. Hsieh, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/122,349

(22) Filed: Jul. 24, 1998

(51) Int. Cl.[7] ................................................ G06F 12/08

(52) U.S. Cl. ....................... 711/214; 711/133; 711/135; 711/144; 711/145; 711/159

(58) Field of Search ................................ 711/127, 154, 711/214–215, 118, 133–135, 109, 141–145, 156, 159, 217–219; 712/225–226

(56) References Cited

U.S. PATENT DOCUMENTS

| | | | | | |
|---|---|---|---|---|---|
| 4,648,030 | A | * | 3/1987 | Bomba et al. | 711/141 |
| 5,524,233 | A | * | 6/1996 | Milburn et al. | 711/141 |
| 5,594,876 | A | * | 1/1997 | Getzlaff et al. | 710/113 |
| 5,768,593 | A | * | 6/1998 | Walters et al. | 717/141 |
| 5,778,431 | A | * | 7/1998 | Rahman et al. | 711/135 |
| 5,778,432 | A | | 7/1998 | Rubin et al. | |
| 6,049,866 | A | * | 4/2000 | Earl | 712/227 |
| 6,260,130 | B1 | | 7/2001 | Liedtke | 711/206 |

FOREIGN PATENT DOCUMENTS

| | | | | |
|---|---|---|---|---|
| EP | 0049387 | | | 4/1982 |
| EP | 0090575 | | | 10/1983 |
| EP | 0 210 384 | A1 | | 2/1987 |
| EP | 0210384 | A1 | | 4/1987 |
| EP | 0557884 | A1 | * | 1/1993 |
| EP | 0817081 | A2 | | 7/1998 |
| GB | 2210480 | A | | 7/1989 |
| WO | WO97/22933 | | | 6/1997 |

OTHER PUBLICATIONS

Visual Instruction Set (VIS™) User's Guide, Sun Microsystems, Version 1.1, Mar. 1997, pp. 1–127.

AMD–3D Technology Manual, AMD, Publication No. 21928, Issued Date: Feb. 1998, pp. 1–58.

The UltraSPARC Processor—Technology White Paper, The UltraSPARC Archtitecture, Sun Microsystems, Jul. 17, 1997, pp. 1–9.

21164 Alpha Microprocessor Data Sheet, Samsung Electronics, 1997, pp. 1–77.

TM1000 Preliminary Data Book, (Tri Media), 1997, Philips Electronics, 7 pgs.

Case, Brian, "Intel Reveals Next–Generation 960 H–Series", 1994 *MicroDesign Resources*, vol. 8, No. 13, Oct. 3, 1994, pp. 1–5.

Baron, Max et al., "32–bit CMOS CPU chip acts like a mainframe", *Electronic Design*, Apr. 16, 1987, pp. 95–100.

* cited by examiner

*Primary Examiner*—Denise Tran
(74) *Attorney, Agent, or Firm*—Blakely, Sokoloff, Taylor & Zafman LLP

(57) ABSTRACT

A method and apparatus for including in a computer system, instructions for performing cache memory invalidate and cache memory flush operations. In one embodiment, the computer system comprises a cache memory having a plurality of cache lines each of which stores data, and a storage area to store a data operand. An execution unit is coupled to the storage area, and operates on data elements in the data operand to invalidate data in a predetermined portion of the plurality of cache lines in response to receiving a single instruction.

38 Claims, 6 Drawing Sheets

METHOD AND APPARATUS FOR PERFORMING CACHE SEGMENT FLUSH AND CACHE SEGMENT INVALIDATION OPERATIONS

BACKGROUND OF THE INVENTION

1. Field of the Invention

The present invention relates in general to the field of computer systems, and in particular, to an apparatus and method for providing instructions which facilitate the invalidation and/or flushing of a portion of a cache memory within a cache system.

2. Description of the Related Art

The use of a cache memory with a computer system facilitates the reduction of memory access time. The fundamental idea of cache organization is that by keeping the most frequently accessed instructions and data in the fast cache memory, the average memory access time will approach the access time of the cache. To achieve the optimal tradeoffs between cache size and performance, typical computer systems implement a cache hierarchy, that is, different levels of cache memory. The different levels of cache correspond to different distances from the computer system core. The closer the cache is to the computer system, the faster the data access. However, the closer the cache is to the computer system, the more costly it is to implement. As a result, the closer the cache level, the faster and smaller the cache.

A cache unit is typically located between the computer system and main memory; it typically includes a cache controller and a cache memory such as a static random access memory (SRAM). The cache unit can be included on the same chip as the computer system or can exist as a separate component. Alternatively, the cache controller may be included on the computer system chip and the cache memory is formed by external SRAM chips.

The performance of cache memory is frequently measured in terms of its hit ratio. When the computer system refers to memory and finds the data in its cache, it is said to produce a hit. If the data is not found in cache, then it is in main memory and is counted as a miss. If a miss occurs, then an allocation is made at the entry indexed by the address of the access. The access can be for loading data to the computer system or storing data from the computer system to memory. The cached information is retained by the cache memory until it is no longer needed, made invalid or replaced by other data, in which instances the cache entry is de-allocated.

If other computer systems or system components have access to the main memory, as is the case, for example, with a DMA controller, and the main memory can be overwritten, the cache controller must inform the applicable cache that the data stored within the cache is invalid if the data in the main memory changes. Such an operation is known as cache invalidation. If the cache controller implements a write-back strategy and, with a cache hit, only writes data from the computer system to its cache, the cache content must be transferred to the main memory under specific conditions. This applies, for example, when the DMA chip transfers data from the main memory to a peripheral unit, but the current values are only stored in an SRAM cache. This type of operation is known as a cache flush.

Currently, such invalidating and/or flushing operations are performed automatically by hardware, for an associated cache line. In certain situations, software have been developed to invalidate and/or flush the cache memory. Currently, such software techniques involve the use of an instruction which operates on the entire cache memory corresponding to the computer system from which the instruction originated. However, such invalidation and/or flushing operations require a large amount of time to complete, and provides no granularity or control for the user to invalidate and/or flush specific data or portions of data from the cache, while retaining the other data within the cache memory intact. When a flushing operation operates only on the entire cache memory, it results in inflexibility and impacts system performance. In addition, where a cache invalidation operation operates only on the entire cache, data corruption may result.

BRIEF SUMMARY OF THE INVENTION

A method and apparatus for including in a computer system, instructions for performing cache memory invalidate and cache memory flush operations. In one embodiment, the computer system comprises a cache memory having a plurality of cache lines each of which stores data, and a storage area to store a data operand. An execution unit is coupled to the storage area, and operates on data elements in the data operand to invalidate data in a predetermined portion of the plurality of cache lines in response to receiving a single instruction.

BRIEF DESCRIPTION OF THE DRAWINGS

The invention is illustrated by way of example, and not limitation, in the figures. Like reference indicate similar elements.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Figure 1:
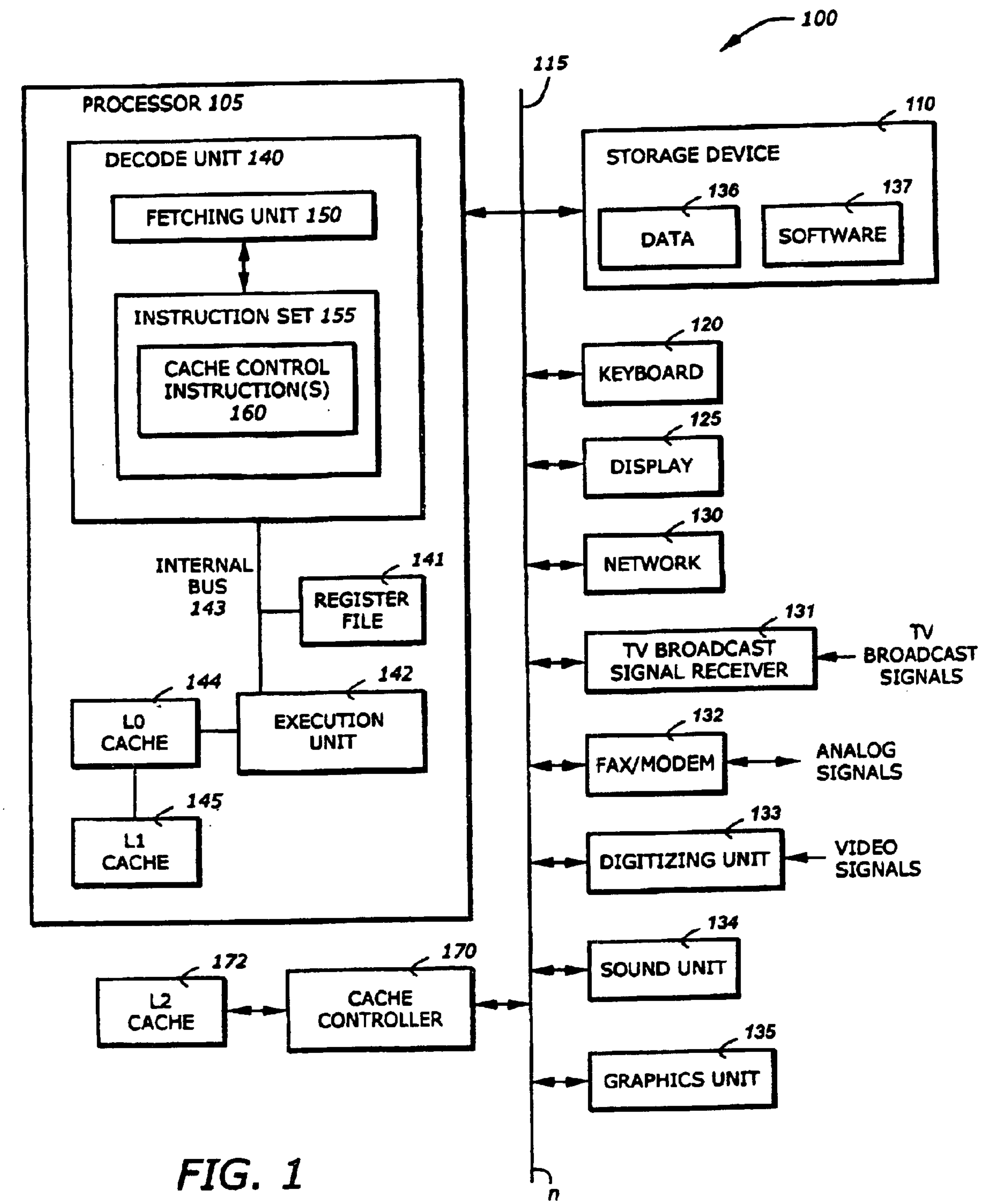
FIG. 1 illustrates an exemplary computer system in accordance with one embodiment of the invention.

FIG. 1 illustrates one embodiment of a computer system 100 which implements the principles of the present invention. Computer system 100 comprises a computer system 105, a storage device 110, and a bus 115. The computer system 105 is coupled to the storage device 110 by the bus 115. The storage device 110 represents one or more mechanisms for storing data. For example, the storage device 110 may include read only memory (ROM), random access memory (RAM), magnetic disk storage mediums, optical storage mediums, flash memory devices and/or other machine readable mediums. In addition, a number of user input/output devices, such as a keyboard 120 and a display 125, are also coupled to the bus 115. The computer system 105 represents a central processing unit of any type of architecture, such as CISC, RISC, VLIW, or hybrid architecture. In addition, the computer system 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more buses (e.g., AGP, PCI, ISA, X-Bus, VESA, etc.) and bridges (also termed as bus controllers). While this embodiment is described in relation to a single computer system computer system, the invention could be implemented in a multi-computer system computer system.

In addition to other devices, one or more of a network 130, a TV broadcast signal receiver 131, a fax/modem 132, a digitizing unit 133, a sound unit 134, and a graphics unit 135 may optionally be coupled to bus 115. The network 130 and fax modem 132 represent one or more network connections for transmitting data over a machine readable media (e.g., carrier waves). The digitizing unit 133 represents one or more devices for digitizing images (i.e., a scanner, camera, etc.). The sound unit 134 represents one or more devices for inputting and/or outputting sound (e.g., microphones, speakers, magnetic main memories, etc.). The graphics unit 135 represents one or more devices for generating 3-D images (e.g., graphics card). FIG. 1 also illustrates that the storage device 110 has stored therein data 136 and software 137. Data 136 represents data stored in one or more of the formats described herein. Software 137 represents the necessary code for performing any and/or all of the techniques described with reference to FIGS. 2, and 4–6. Of course, the storage device 110 preferably contains additional software (not shown), which is not necessary to understanding the invention.

FIG. 1 additionally illustrates that the computer system 105 includes decode unit 140, a set of registers 141, and execution unit 142, and an internal bus 143 for executing instructions. The computer system 105 further includes two internal cache memories, a level 0 (L0) cache memory which is coupled to the execution unit 142, and a level 1 (L1) cache memory, which is coupled to the L0 cache. An external cache memory, i.e., a level 2 (L2) cache memory 172, is coupled to bus 115 via a cache controller 170. The actual placement of the various cache memories is a design choice or may be dictated by the computer system architecture. Thus, it is appreciated that the L1 cache could be placed external to the computer system 105. In alternate embodiments, more or less levels of cache (other than L1 and L2) may be implemented. It is appreciated that three levels of cache hierarchy are shown in FIG. 1, but there could be more or less cache levels. For example, the present invention could be practiced where there is only one cache level (L0 only) or where there are only two cache levels (L0 and L1), or where there are four or more cache levels.

Of course, the computer system 105 contains additional circuitry, which is not necessary to understanding the invention. The decode unit 140, registers 141 and execution unit 142 are coupled together by internal bus 143. The decode unit 140 is used for decoding instructions received by computer system 105 into control signals and/or micro code entry points. In response to these control signals and/or micro code entry points, the execution unit 142 performs the appropriate operations. The decode unit 140 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The decode unit 140 is shown including a fetching unit 150 which fetches instructions, and an instruction set 165 for performing operations on data. In one embodiment, the instruction set 165 includes a cache control instruction(s) provided in accordance with the present invention. In one embodiment, the cache control instructions include: a cache segment invalidate instruction(s) 162, a cache segment flush instruction(s) 164 and a cache segment flush and invalidate instruction(s) 166 provided in accordance with the present invention. An example of the cache segment invalidate instruction(s) 162 includes a Page Invalidate (PGINVD) instruction which operates on a user specified linear address and invalidates the 4 k Byte physical page corresponding to the linear address from all levels of the cache hierarchy for all agents in the computer system that are connected to the computer system. An example of the cache segment flush instruction 164 includes a Page Flush (PGFLUSH) instruction 164 that flushes data in the 4 Kbyte physical page corresponding to the linear address on which the operation is performed. An example of the cache segment flush and invalidate instruction 166 includes a Page Flush/Invalidate (PGFLUSHINV) instruction 166 that first flushes data in the 4 Kbyte physical page corresponding to the linear address on which the operation is performed, and then invalidates the 4 kilobyte physical page corresponding to the linear address. In alternative embodiments, the cache control instruction(s) may operate on either a user specified linear or physical address and perform the Associated invalidate and/or flush operations in accordance with the principles of the invention.

In addition to the cache segment invalidate instruction(s) 162, the cache segment flush instruction(s) 164, and the cache segment flush and invalidate instruction(s) 166, computer system 105 can include new instructions and/or instructions similar to or the same as those found in existing general purpose computer systems. For example, in one embodiment the computer system 105 supports an instruction set which is compatible with the Intel® Architecture instruction set used by existing computer systems, such as the Pentium®II computer system. Alternative embodiments of the invention may contain more or less, as well as different instructions and still utilize the teachings of the invention.

The registers 141 represent a storage area on computer system 105 for storing information, such as control/status information, scalar and/or packed integer data, floating point data, etc. It is understood that one aspect of the invention is the described instruction set. According to this aspect of the invention, the storage area used for storing the data is not critical. The term data processing system is used herein to refer to any machine for processing data, including the computer system(s) described with reference to FIG. 1.

Figure 2:
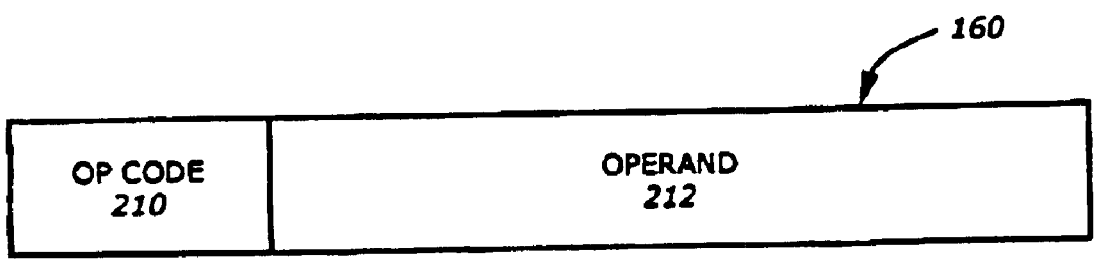
FIG. 2 illustrates one embodiment of the format of a cache control instruction 160 provided according to one embodiment of the invention.

FIG. 2 illustrates one embodiment of the format of any one of the cache segment invalidate instructions 162, the cache segment flush instruction 164, and the cache segment flush and invalidate instructions 166 provided in accordance with the present invention. For discussion purposes, the instructions 162, 164 and 166 will be referred to as the cache control instruction 160. The cache control instruction 160 comprises and operational code (OP CODE) 210 which identifies the operation of the cache control instruction 160 and an operand 212 which specifies the name of a register of memory location which holds a starting address of the data object that the instruction 160 will be operating on.

Figure 3:
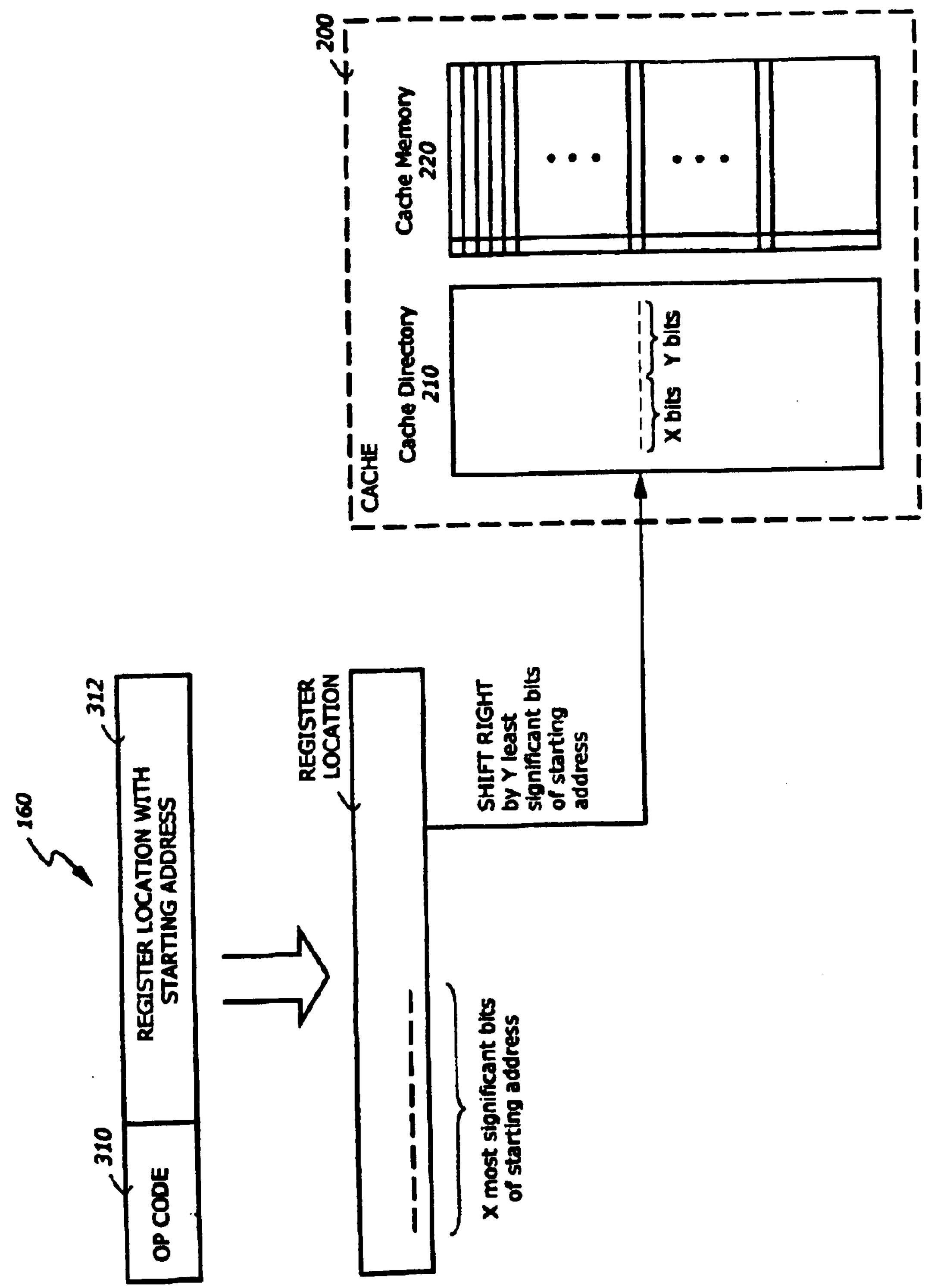
FIG. 3 illustrates the general operation of the cache control technique according to one embodiment of the invention.

FIG. 3 illustrates the general operation of the cache control instruction 160 according to one embodiment of the invention. In the practice of the invention, the cache control instruction 160 provides the register (or memory) location which holds a starting address of the data object that the instruction 160 will be operating on. In one embodiment, the starting address includes X most significant bits, which are stored in the register (or memory) location, and Y least significant bits. The cache control process associated with the cache control instruction 160 then shifts the X bits to the right by Y bit positions to obtain the complete starting address. The cache control instruction 160 then operates on the data corresponding to the starting address, and data corresponding to the Z subsequent addresses, in cache memory. In one embodiment, the cache control instruction 160 operates on one page of data stored in cache, of which the beginning address is stored in a register (or memory) location specified in the operand 212 of the cache control instruction. In alternate embodiments, the cache control instruction 160 may operate on any predetermined amount of data stored in cache, of which the beginning address is stored in a register (or memory) location specified in the operand 212 of the cache control instruction.

In FIG. 1, only L0, L1 and L2 levels are shown, but it is appreciated that more or less levels can be readily implemented. The embodiment shown in FIGS. 4–6 describes the use of the invention with respect to one cache level.

Figure 4A:
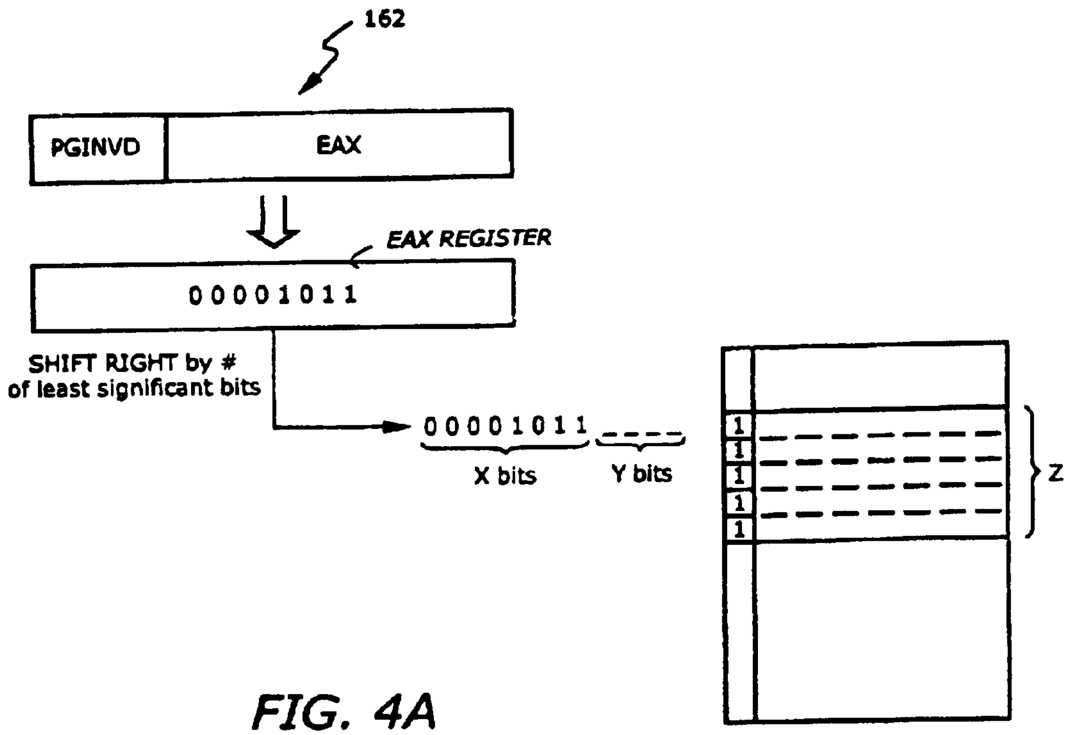
FIG. 4A illustrates one embodiment of the operation of the cache segment invalidate instruction 162.

Details of various embodiments of the cache control instruction 160 will now be described. The cache segment invalidate instruction 162 will first be described. FIG. 4A illustrates one embodiment of the cache segment invalidate instruction 162. Upon receiving the cache segment invalidate instruction 162, the computer system 105 determines, from the operand 312 of the instruction 162, the register location in which the most signification bits of the starting address of the data object is stored. The computer system 105 then shifts the value in the operand 312, by the number of least significant bits of the starting address. Once the complete starting address is obtained, the computer system 105 sets the invalidate bit of the cache memory 200 corresponding to the affected locations of the cache memory. In one embodiment, one page of the cache memory 220 having a starting address corresponding to that stored in the operand 312 will be invalidated. In alternate embodiments, data in any predetermined portions of the cache memory 220 having a starting address corresponding to that stored in the operand 312 will be invalidated using the present technique.

Figure 4B:
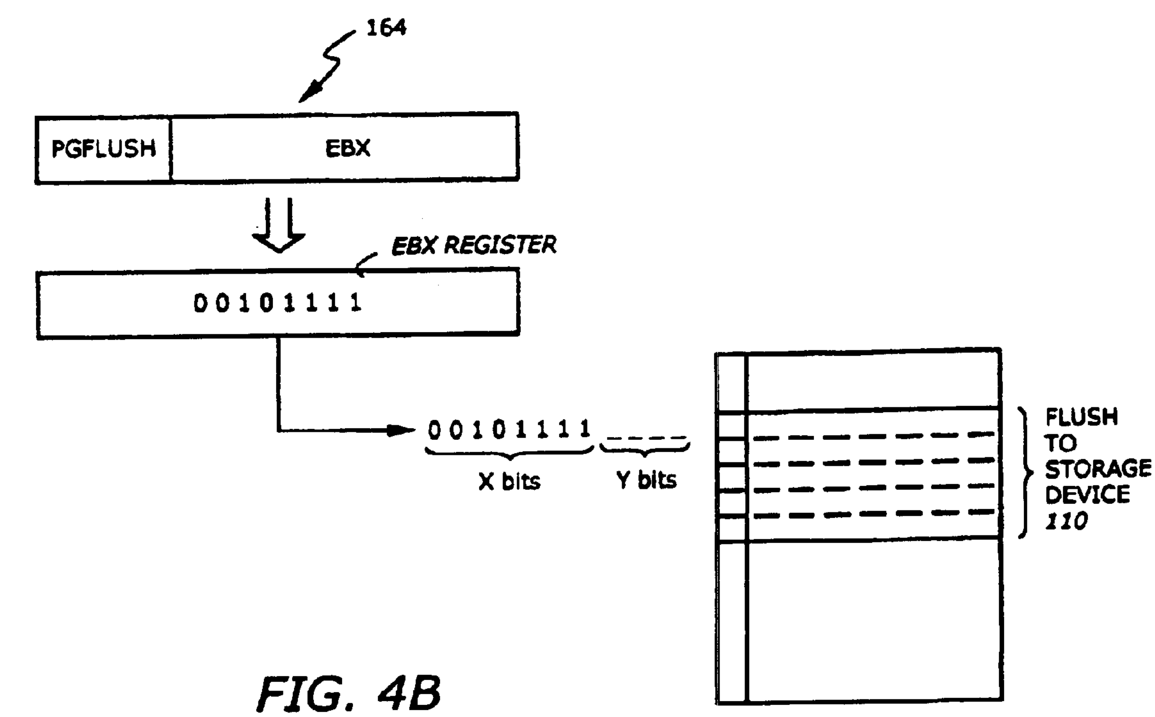
FIG. 4B illustrates one embodiment of the operation of the cache segment flush instruction 164.

The cache segment flush instruction 164 will next be described. FIG. 4B illustrates one embodiment of the cache segment flush instruction 164. Upon receiving the cache segment flush instruction 164, the computer system 105 determines, from the operand 312 of the instruction 164, the register location in which the most signification bits of the starting address of the data object is stored. The computer system 105 then shifts the value in the operand 312, by the number of least significant bits of the starting address. Once the complete starting address is obtained, the computer system flushes the locations of cache memory 220 affected by execution of the instruction 164. In one embodiment, one page of the cache memory 220 having a starting address corresponding to that stored in the operand 312 will be flushed. In alternate embodiments, data in any predetermined portions of the cache memory 220 having a starting address corresponding to that stored in the operand 312 will be flushed.

The cache segment flush/invalidate instruction 166 will now be described. FIG. 4C illustrates one embodiment of the cache segment flush and invalidate instruction 166. Upon receiving the cache segment flush instruction 166, the computer system 105 determines, from the operand 312 of the instruction 164, the register location in which the most signification bits of the starting address of the data object is stored. The computer system 105 then shifts the value in the operand 312, by the number of least significant bits of the starting address. Once the complete starting address is obtained, the computer system flushes the locations of cache memory 220 affected by execution of the instruction 164. In one embodiment, one page of the cache memory 220 having a starting address corresponding to that stored in the operand 312 will be flushed. In alternate embodiments, any predetermined portions of the cache memory 220 having a starting address corresponding to that stored in the operand 312 will be flushed. Next, the computer system 105 invalidates the affected areas of the cache memory 220 that have been flushed. In one embodiment, this is performed by setting the invalidate bit of each affected cache line.

Figure 5A:
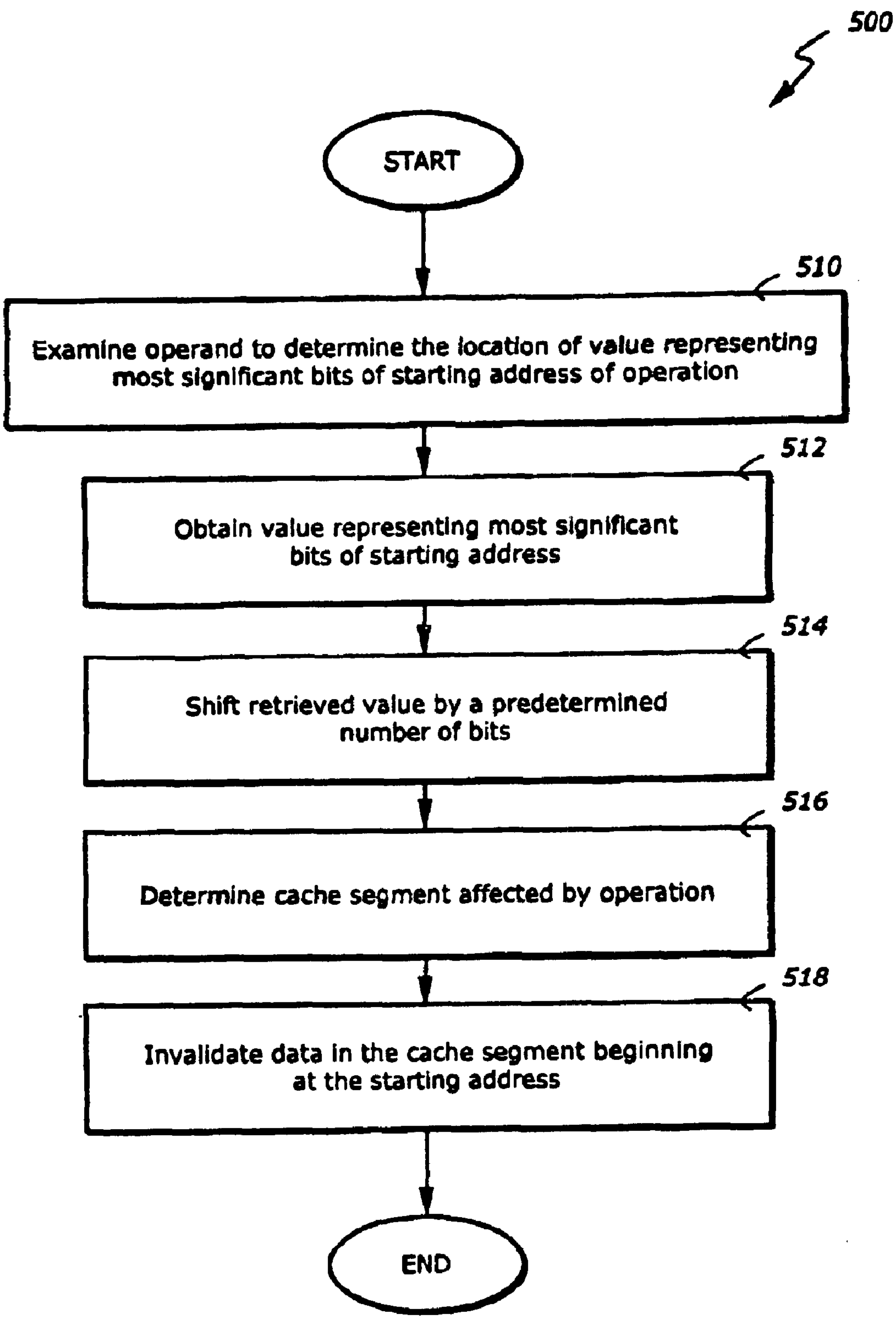
FIG. 5A is a flowchart illustrating one embodiment of the cache segment invalidate process of the present invention.

FIG. 5A is a flowchart illustrating one embodiment of the cache segment invalidate process of the present invention. Beginning from a start state, the process 500 proceeds to process block 510, where it examines the operand 312 of the instruction 62 received by the computer system 105 to determine the storage location of the value representing the most significant bits of the starting address of the corresponding operation. The process 500 then proceeds to process block 512, where it retrieves the value representing the most significant bits of the starting address from the storage location specified. The process 500 then advances to process block 514, where it shifts the retrieved value by a predetermined number of bits. In one embodiment, the predetermined number represents the number of least significant bits in the starting address. Next, the process 500 determines the cache segment affected by the operation or the instruction 162, as shown in process block 516. In one embodiment, the cache segment is a page. In one embodiment, a page contains 4 k Bytes. In alternate embodiments, the cache segment may be any predetermined portion of the cache memory. The process 500 then proceeds to process block 516, where it invalidates the data in the corresponding cache segment beginning at the starting address specified. In one embodiment, this is performed by setting the invalid bit corresponding to each cache line in the cache segment. The process 500 then terminates.

Figure 5B:
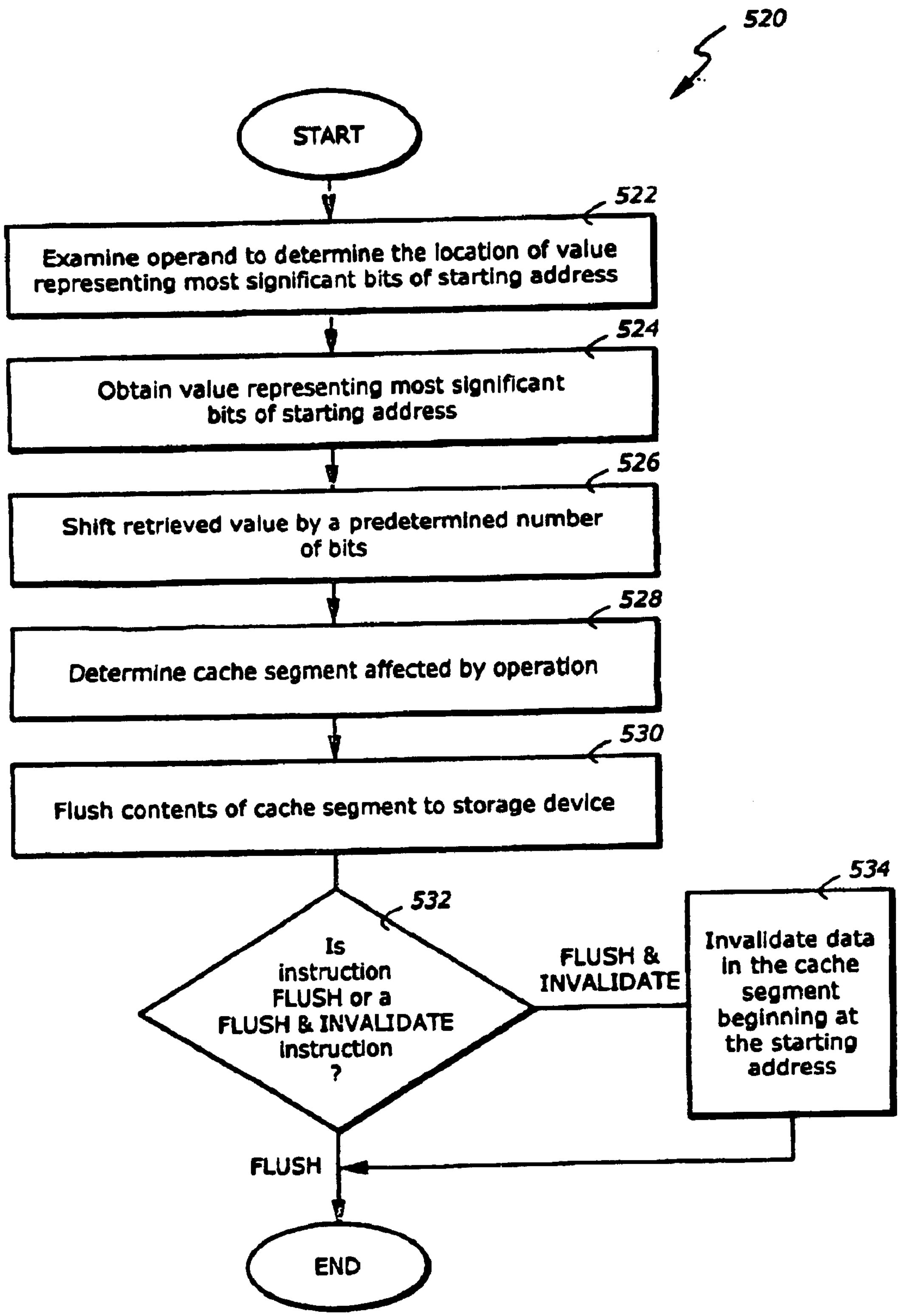
FIG. 5B is a flowchart illustrating one embodiment of the cache segment flush process of the present invention.

FIG. 5B is a flowchart illustrating one embodiment of the cache segment flush process of the present invention. Beginning from a start state, the process 520 proceeds to process block 522, where it examines the operand 312 of the instruction 64 or 66 received by the computer system 105 to determine the storage location of the value representing the most significant bits of the starting address of the corresponding operation. The process 520 then proceeds to process block 524, where it retrieves the value representing the most significant bits of the starting address from the storage location specified. The process 520 then advances to process block 526, where it shifts the retrieved value by a predetermined number of bits. In one embodiment, the predetermined number represents the number of least significant bits in the starting address. Next, the process 520 determines the cache segment affected by the operation or the instruction 64 or 66, as shown in process block 528. In one embodiment, the cache segment is a page. In alternate embodiments the cache segment may be any predetermined portion of the cache. The process 520 then proceeds to process block 530, where it flushes the contents of the cache segment to the storage device specified. The process 520 then proceeds to decision block 530, where it queries if the instruction received corresponding to the operation is a FLUSH or a FLUSH and INVALIDATE instruction. If the instruction is a FLUSH, the process 520 terminates. If the instruction is a FLUSH and INVALIDATE instruction, the process 520 proceeds to process block 534, where it invalidates the data in the corresponding cache segment beginning at the starting address specified. In one embodiment, this is performed by setting the invalid bit corresponding to each cache line in the cache segment. The process 520 then terminates.

The use of the present invention thus enhances system performance by providing an invalidate instruction and/or a flush instruction for invalidating and/or flushing data in any predetermined portion of the cache memory. For cases where consistency between the cache and main memory are maintained by software, system performance is enhanced, since flushing only the affected portions of cache is more efficient and flexible than flushing the entire cache. In addition, system performance is enhanced by having a flushing and/or invalidate operation that has a granularity that is larger than a cache line size, since the user can flush and/or invalidate a memory region using a single instruction instead of having to alter the code, as the computer system changes the size of a cache line.

While a preferred embodiment has been described, it is to understood that the invention is not limited to such use. In addition, while the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A computer system comprising:

a cache memory having a plurality of cache lines each of which stores data;

a storage area to store a data operand; and an execution unit coupled to said storage area to operate on data elements in said data operand containing a portion of a user specified starting address to invalidate data in a predetermined portion of the plurality of cache lines beginning at the user specified starting address in response to receiving a single instruction of a processor instruction set.

2. The computer system of claim 1, wherein the data operand is a register location.

3. The computer system of claim 1, wherein the portion of the starting address includes a plurality of most significant bits of the starting address.

4. The computer system of claim 3, wherein execution unit shifts the data elements by a predetermined number of bit positions to obtain the starting address of the cache line in which data is to be invalidated.

5. The computer system of claim 1, wherein the predetermined portion of the plurality of cache lines is a page in the cache memory.

6. A computer system comprising:

a first storage area to store data;

a cache memory having a plurality of cache lines each of which stores data;

a second storage area to store a data operand containing a portion of an address; and an execution unit coupled to said first storage area, said second storage area, and said cache memory, said execution unit to operate on the portion of a user specified address in said data operand to copy data from a predetermined portion of the plurality of cache lines beginning at the user specified starting address in the cache memory to the first storage area, in response to receiving a single instruction of a processor instruction set.

7. The computer system of claim 6, wherein the data operand is a register location.

8. The computer system of claim 7, wherein the register location contains a plurality of most significant bits of a starting address of the cache line in which data is to be copied.

9. The computer system of claim 8, wherein execution unit shifts the portion of an address by a predetermined number of bit positions to obtain the starting address of the cache line in which data is to be copied.

10. The computer system of claim 6, wherein the predetermined portion of the plurality of cache lines is a page in the cache memory.

11. The computer system of claim 6, wherein the execution unit further invalidates data in the predetermined portion of the plurality of cache lines in response to receiving the single instruction, upon copying the data to the first storage area.

12. A computer system comprising:

a cache memory having a plurality of cache lines each of which stores data;

a storage area to store a data operand; and an execution unit coupled to said storage area to operate on data elements in said data operand identifying a user-definable linear or physical address identifying a predetermined portion of the plurality of cache lines to invalidate data in the predetermined portion of the plurality of cache lines in response to receiving a single cache control instruction of a processor instruction set, the single cache control instruction including a reference to the data operand.

13. The computer system of claim 12, wherein the data operand is a register location.

14. The computer system of claim 13, wherein execution unit shifts the data elements by a predetermined number of bit positions to obtain the starting address of the cache line in which data is to be invalidated.

15. The computer system of claim 12, wherein the predetermined portion of the plurality of cache lines is a page in the cache memory.

16. A processor comprising:

a decoder configured to decode instructions; and a circuit coupled to said decoder, said circuit in response to a single decoded instruction of a processor instruction set being configured to:

read a portion of an address located in a register specified in the decoded instruction to obtain a user specified starting address of a predetermined area of a cache memory on which the instruction will be performed; and invalidate in the predetermined area of cache memory.

17. The processor of claim 16, wherein the portion of an address includes a plurality of most significant bits of the starting address.

18. The processor of claim 17, wherein the circuit shifts the portion of an address by a predetermined number of bits positions to obtain the starting address of a cache line of the predetermined area of the cache memory in which data is to be invalidated.

19. The processor of claim 16, wherein the predetermined area of the cache memory comprises a plurality of cache lines forming a page in the cache memory.

20. A processor comprising:

a decoder to decode instructions, and a circuit coupled to said decoder, said circuit in response to a single decoded instruction of a processor instruction set being configured to: read a portion of an address located in a register specified in the decoded instruction to obtain a user specified starting address of a predetermined area of a cache memory on which the instruction will be performed;

copy data in the predetermined area of the cache memory; and store the copied data in storage area separate from the cache memory.

21. The processor of claim 20, wherein the portion of an address includes a plurality of most significant bits of the starting address.

22. The processor of claim 21, wherein the circuit shifts the portion of the address by a predetermined number of bit positions to obtain the starting address of a cache line of the cache memory in which data is to be copied.

23. The processor of claim 21, wherein the predetermined area comprises a plurality of cache lines forming a page in the cache memory.

24. The processor of claim 21, wherein said circuit further invalidates the data in the predetermined portion of the plurality of cache lines in response to receiving the single instruction, upon copying the data to the storage area.

25. A computer-implemented method, comprising:

a) decoding a single instruction of a processor instruction set;

b) in response to said decoding of the single instruction, obtaining a portion of a user specified starting address of a predetermined area of a cache memory on which the single instruction will be performed by reading a portion of an address contained in a storage location specified in the decoded instruction; and c) completing execution of said single instruction by invalidating data in the predetermined area of the cache memory.

26. The method of claim 25, wherein c) comprises setting an invalid bit corresponding to the predetermined area of the cache memory.

27. The method of claim 25 wherein b) comprises:

shifting the portion of the starting address by a predetermined number of bit positions to obtain the starting address of a cache line of the cache memory in which data is to be invalidated.

28. The method of claim 27, wherein the portion of the starting address contains a plurality of most significant bits of the starting address, and the predetermined number of bit positions represent the number of least significant bits of the starting address.

29. The method of claim 25, wherein the predetermined area is a page in the cache memory.

30. A computer-implemented method, comprising:

a) decoding a single instruction of a processor instruction set;

b) in response to said decoding the single instruction, obtaining a portion of a user specified starting address of a predetermined area of a cache memory on which the single instruction will be performed by reading a portion of an address contained in a storage location specified in the decoded instruction; and c) completing execution of said single instruction by copying data in the predetermined area of cache memory and storing the copied data in a storage area separate from the cache memory.

31. The method of claim 30, wherein c) comprises setting an invalid bit corresponding to the predetermined area of the cache memory.

32. The method of claim 30, wherein b) comprises:

shifting the portion of the starting address by a predetermined number of bit positions to obtain the starting address of a cache line associated with the predetermined area.

33. The method of claim 32, wherein the portion of the starting address contains a plurality of most significant bits of the starting address, and the predetermined number of bit positions represent the number of least significant bits of the starting address.

34. The method of claim 30, wherein the predetermined area comprises a plurality of cache lines forming a page in the cache memory.

35. The method of claim 30, further comprises:

d) invalidating the data in the predetermined area in response to receiving the single instruction, upon copying the data to the storage area.

36. A computer-readable apparatus, comprising:

a computer-readable medium that stores an instruction which when executed by a processor causes said processor to:

a) decode a single instruction of a processor instruction set;

b) in response to decoding the single instruction, obtain a portion of a user specified starting address of a predetermined area of a cache memory on which the single instruction will be performed by reading a portion of an address contained in a storage location specified in the decoded instruction; and c) complete execution of said single instruction by invalidating data in the predetermined area of the cache memory.

37. A computer-readable apparatus comprising:

a computer-readable medium that stores an instruction which when executed by a processor causes said processor to:

a) decode a single instruction of a processor instruction set;

b) in response to decoding the single instruction, obtain a portion of a user specified starting address of a predetermined area of a cache memory on which the single instruction will be performed by reading a portion of an address contained in a storage location specified 8 in the decoded single instruction; and c) complete execution of said single instruction by copying data in the predetermined area of the cache memory and storing the copied data in a storage area separate from the cache memory.

38. The apparatus of claim 37, wherein the instruction further causes the processor to:

invalidate the data in a predetermined portion of a plurality of cache lines forming the predetermined area of the cache memory in response to receiving the instruction, upon copying the data to the storage area.

* * * * *